Oct. 24, 1967     J. P. LICATA ET AL     3,349,307

ELECTRIC MOTOR CONTROL CIRCUIT

Filed April 16, 1965     2 Sheets-Sheet 1

INVENTORS
Joseph P. Licata
BY Frederick T. Tucker

Richard G. Stahr
Their Attorney

Oct. 24, 1967       J. P. LICATA ETAL       3,349,307
            ELECTRIC MOTOR CONTROL CIRCUIT
Filed April 16, 1965                    2 Sheets-Sheet 2

INVENTORS
Joseph P. Licata
BY Frederick T. Tucker

Richard G. Stahr
Their Attorney

United States Patent Office 3,349,307
Patented Oct. 24, 1967

3,349,307
ELECTRIC MOTOR CONTROL CIRCUIT
Joseph P. Licata and Frederick T. Tucker, Rochester, N.Y., assignors to General Motors Corporation, Detroit, Mich., a corporation of Delaware
Filed Apr. 16, 1965, Ser. No. 448,739
15 Claims. (Cl. 318—221)

ABSTRACT OF THE DISCLOSURE

This invention relates to a speed control circuit for PCM type motors in which the phase winding is shunted by a resistor to reduce motor speed. To provide full starting torque, in accordance with this invention, a normally open controllable switching device, such as a silicon control rectifier, is connected in series with the shunting resistor. Also connected across the phase winding is a high impedance circuit, such as a resistance voltage divider network including a potentiometer, across which the potential increases with increases of motor speed. The control electrode of the switching device is connected to the movable contact of the potentiometer, therefore, by adjusting the potentiometer, the controllable switching device may be triggered conductive at any selected electrical angle during the first half of each alternating current half cycle during which the switching device is forward poled, thereby shunting the phase winding with the resistor over the remaining portion of these half cycles.

---

Figure 1:
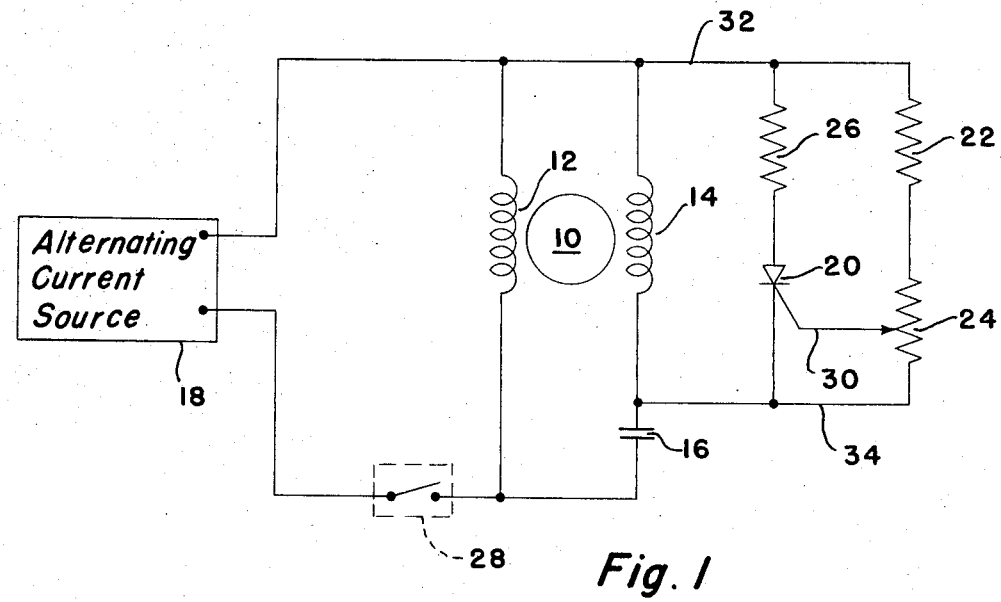

This invention relates to motor speed control circuits and, more specifically, to a variable speed control circuit for single phase alternating current induction type motors.

Single phase alternating current induction motors must be provided with some device to make them self-starting. One such device, for example, is the series combination of a capacitor and a phase winding connected in parallel with the running winding in such a manner that the current flow therethrough is displaced in phase from the current through the running winding, thereby producing a starting torque.

Motors of this type normally operate at a constant, fixed speed which is determined by the frequency of the alternating current supply potential, the number of magnetic poles produced by the running winding and rotor slip.

In certain applications where motors of this type may be advantageously used, it may be desirable to operate the motor at varying speeds. To change the speed of motors of this type, it is necessary to change either the source frequency, the number of poles or the slip. Of these three factors, slip is most easily and economically changed.

The conventional method of changing the speed of motors of this type by varying the slip, is to connect a resistor in shunt with the phase winding. A particular disadvantage of this method is that a reduced starting torque results. In fact, the starting torque may be so low that it is impossible to start the motor with the load of only a fan. Although the low starting torque disadvantage may be overcome by the use of a mechanical centrifugal switch which may be closed when the motor comes up to speed, this is a cumbersome and undesirable alternative which does not provide variable speed control.

As the use of induction motors of this type is becoming increasingly popular, the requirement of a reliable and economical variable speed control circuit is apparent.

It is, therefore, an object of this invention to provide an improved speed control circuit for alternating current induction type motors.

It is another object of this invention to provide an improved speed control circuit which provides variable speed control of alternating current induction type motors.

In accordance with this invention, a variable speed control circuit for alternating current induction type motors is provided wherein a control potential, which is developed across a variable impedance connected in parallel with the phase winding and which increases in magnitude as the speed of the motor increases, is applied to the control electrode of a controllable switching device, also connected in parallel with the phase winding, for triggering this device to conduction whereby the potential applied to the phase winding over that portion of each cycle during which it is conducting is reduced to substantially zero, thereby providing for variable speed control by varying the variable impedance.

Figure 2:
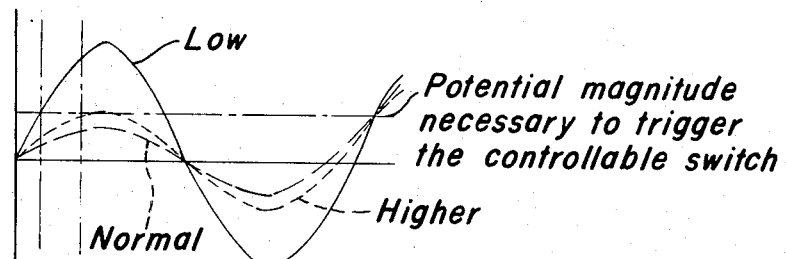
Figure 3:
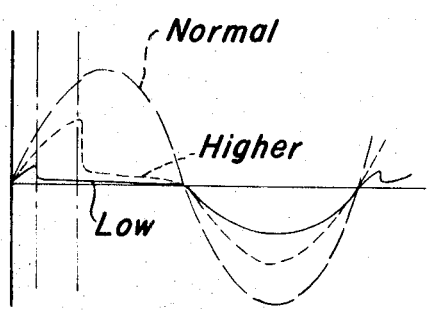
Figure 4:
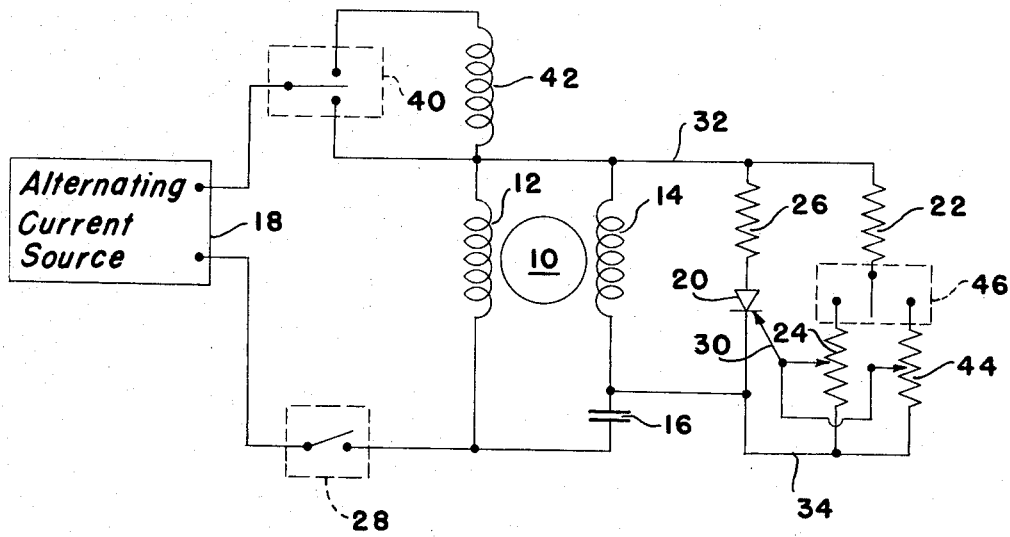

For a better understanding of the present invention, together with additional objects, advantages and features thereof reference is made to the following description and accompanying drawing. in which:

FIGURE 1 sets forth the novel variable speed control circuit of this invention in schematic form, FIGURE 2 is a set of curves showing the control potential magnitude for different motor speeds, FIGURE 3 is a set of curves showing the potential across the phase windings for the different speeds produced by the control potentials of FIGURE 2, and FIGURE 4 schematically sets forth the novel variable speed control circuit of this invention as used with a two speed motor.

In FIGURES 1 and 4 like elements have been given like characters of reference.

Referring to FIGURE 1, a motor, generally indicated at 10, having a running winding 12 and a starting circuit, comprising the series combination of phase winding 14 and capacitor 16, for producing a phase displacement of the current supplied to the two windings from a suitable alternating current source 18, is schematically set forth. As alternating current source 18 may be any one of the many conventional sources well known in the art and forms no part of this invention, it has been herein indicated in block form.

Connected in shunt with phase winding 14 is a controllable switching device 20, herein shown as a conventional silicon controlled rectifier, for reducing to substantially zero the potential across phase winding 14 over that portion of each cycle during which it is conducting. The speed of motor 10 is determined by the portion of each cycle during which this switching device is conducting, the greater the portion, the lower the speed of the motor. A fixed resistor 26 may be required in series with silicon controlled rectifier 20 or, with other applications, this resistor may not be necessary.

Silicon controlled rectifiers are commercially available devices and are similar in operation to Thyratron tubes. That is, with the anode and cathode electrodes thereof connected to a positive and a negative polarity potential, respectively, the device will conduct only upon the application of a control potential of sufficient magnitude and of a polarity which is positive in respect to the cathode to the control electrode thereof. Upon being triggered to conduction, this device will continue conducting until the anode-cathode circuit is interrupted or the polarities of the applied potentials reversed.

Although the controllable switching device has been herein indicated to be a silicon controlled rectifier, it is to be specifically understood that alternate controllable switching devices may be employed without departing from the spirit of the invention.

Also connected in shunt across phase winding 14 is a high impedance electrical circuit, herein shown as the series combination of fixed resistor 22 and variable resistor 24, which serves as a voltage divider from which the control potential necessary to trigger silicon controlled rectifier 20 to conduction may be taken. The impedance of this circuit should be high, of a magnitude of 5.5 kilohms or more, relative to that of phase winding 14 so that the starting torque of the motor will not be greatly effected.

This circuit may be of a variety of arrangements depending upon the application. For example, a single variable impedance element may be used, the series combination of two or more fixed impedance elements with the control potential taken across any one or combination of elements may be used or the arrangement of FIGURE 1 may be used. Any arrangement of resistor elements or other impedance elements which may serve as a voltage divider from which the control potential for triggering the controllable switching device may be taken may be employed without departing from the spirit of the invention.

The control potential taken from the high impedance circuit may be applied to the control electrode of silicon controlled rectifier switching device 20 by electrically connecting the control electrode to the high impedance circuit. As is illustrated in FIGURE 1, to provide variable speed operation, the control electrode may be connected to movable contact of variable resistor 24 by an electrical circuit or wire 30.

In operation, the potential across phase winding 14 and the high impedance circuit increases as the speed of the motor increases. The magnitude of control potential applied to the control electrode of silicon controlled rectifier 20 is that portion of the potential across resistors 22 and 24 which is dropped across the ohmic resistance of the effective portion of variable resistor 24 and, of course, also increases with motor speed. As silicon controlled rectifier 20 may conduct only the half cycles during which line 32 is of a positive polarity and since the control potential must be of a polarity which is positive in respect to the cathode, the effective portion of variable resistor 24 is that portion between line 32 and the movable contact. This effective portion, therefore, is determined by the setting or adjustment of the movable contact of variable resistor 24.

The ohmic resistance value of the effective portion of variable resistor 24 determines both the magnitudes of the control potential and also the rate of increase with motor speed. If the ohmic resistance value of the effective portion of variable resistor 24 is low, the magnitude of control potential increases slowly and does not reach a level sufficiently high to trigger silicon controlled rectifier 20; if the ohmic resistance value is high, the magnitude of control potential rises rapidly to a high level and if the ohmic resistance is of a value between these extremes, the magnitude of control potential increases more slowly to a lower level.

This arrangement of high impedance circuit elements, therefore, provides a control potential which may be taken from the movable contact of variable resistor 24 and which increases in magnitude with motor speed at a rate determined by the adjustment of the movable contact.

Within the range of ohmic resistance values of the effective portion of variable resistor 24 which provide a control potential of a magnitude of sufficient level to trigger silicon controlled rectifier 20, the greater the rate of rise of control potential magnitude, the earlier during the cycle silicon controlled rectifier 20 is triggered to conduction. Depending upon the setting of this adjustment device, therefore, silicon controlled rectifier 20 may be triggered to conduction at any time during each positive excursion of the potential cycles.

The curves set forth in FIGURE 2 illustrate the control potential magnitudes across the effective portion of variable resistor 24 and the curves set forth in FIGURE 3 illustrate the potential magnitudes across phase winding 14 and the high impedance circuit for normal, low and higher but less than normal speed operation. The horizontal line parallel with and above the reference line of FIGURE 2 indicates the magnitude of control potential necessary to trigger silicon controlled rectifier device 20 to conduction. This line will hereinafter be referred to as the triggering potential line.

With silicon controlled rectifier conducting, the potential across winding 14 is reduced to substantially zero. This condition alters the phase relationships between the potentials in the rotor, running and phase windings of the motor in a manner which tends to reduce motor speed. Therefore, the greater the portion of the cycle during which silicon controlled rectifier 20 is conducting, the lower is the speed of the motor.

For normal operation, the movable contact of variable resistor 24 is adjusted to a position at which only a small portion of variable resistor 24 is effective. With the movable contact in this position, the ohmic resistance of the effective portion of variable resistor 24 is of such a low value that, with normal maximum potential across phase winding 14 and the high impedance circuit, as indicated by the long dashed-line curve of FIGURE 3, the control potential does not reach a maximum value of sufficient magnitude to cross the triggering potential line, as indicated by the long dashed-line curve of FIGURE 2. As silicon controlled rectifier 20 is not triggered to conduction with the movable contact of variable resistor 24 at this setting, the motor runs at normal speed.

For low speed operation, the movable contact of variable resistor 24 is adjusted to a position at which a large portion of variable resistor 24 is effective. With the movable contact in this position, the ohmic resistance of the effective portion of variable resistor 24 is of such a value that the control potential thereby produced is a greater portion of the potential across the high impedance circuit and, therefore, increases rapidly with motor speed, crossing the triggering potential line early during the cycle, as indicated by the solid line curve of FIGURE 2.

As silicon controlled rectifier 20 is triggered to conduction early during the positive excursions of the potential cycles, the potential across phase winding 14 is reduced to substantially zero during nearly all of the positive excursions of the potential cycles, as indicated by the solid line curve of FIGURE 3. Under these conditions, motor 10 operates at a low speed.

For higher but less than normal speed operation, the movable contact of variable resistor 24 is adjusted to a position at which the effective portion of variable resistor 24 is smaller than that for low speed operation and greater than that for normal speed operation. With the movable contact in this position, the ohmic resistance of the effective portion of variable resistor 24 is of such a value that the control potential thereby produced is a smaller portion of the potential across the high impedance circuit and, therefore, increases gradually with motor speed, crossing the triggering potential later during the cycle, as indicated by the short dashed-line curve of FIGURE 2.

As silicon controlled rectifier 20 is triggered to conduction later during the positive excursions of the potential cycles, the potential across phase winding 14 is reduced to substantially zero during a smaller portion of the positive excursions, as is indicated by the short dashed-line curve of FIGURE 2. Under these conditions, motor 10 operates at a higher but less than normal speed.

To start motor 10, a conventional switch 28 is closed, whereupon current is supplied from source 18 through running winding 12 and to the series combination of phase winding 14 and capacitor 16. Since these two currents are out of phase, the rotor is given a starting impulse, after which it continues to rotate.

The potential across phase winding 14 and the high impedance circuit increases with motor speed until the reaches a speed at which the control potential across the effective portion of variable resistor 24 is of sufficient magnitude to trigger silicon controlled rectifier 20. The motor speed at which silicon controlled rectifier is triggered to conduction is, of course, determined by the setting or adjustment of the movable contact of variable resistor 24, as has been previously brought out.

Upon being triggered to conduction, silicon controlled rectifier 20 continues to conduct during the remainder of the positive excursion of the cycle until it is extinguished by the reversal of potential polarities with the beginning of the negative excursion of the cycle. This triggering and extinguishing of silicon controlled rectifier 20 repeats with each successive cycle and, therefore, the motor speed tends to stabilize at the speed at which the control potential produced by the effective portion of variable resistor 24 is of sufficient magnitude to trigger silicon controlled rectifier 20 to conduction. The setting or adjustment of the movable contact of variable resistor 24, therefore, determines the speed at which motor 10 will operate.

Between the speeds produced by the control potentials graphically illustrated by the curves of FIGURE 2, an infinite speed adjustment is possible by adjusting or varying the movable contact of variable resistor 24.

The movable contact of variable resistor 24 is normally adjusted to provide a control potential of sufficient magnitude to trigger the silicon controlled rectifier switching device only after the motor has reached at least 50% of its full speed to insure that the motor will at all times have full starting torque.

The wave forms of FIGURES 2 and 3 illustrate the reason that full starting torque is realized with this setting of the movable contact of variable resistor 24. At starting, the magnitude of control potential developed across the effective portion of variable resistor 24 is less than the magnitude necessary to trigger silicon controlled rectifier 20 to conduction. Therefore, phase winding 14 is not shunted by a low resistance circuit, until the motor reaches this speed, therefore, full starting torque is realized.

These wave forms also illustrate that speed regulation is provided with this novel circuit with fluctuations in the supply potential energizing the motor. When the supply potential decreases, the potential across phase winding 14 also decreases, resulting in a decrease of control potential magnitude produced by the effective portion of variable resistor 24. Therefore, silicon controlled rectifier switching device 20 is conducting for a lesser time during the positive excursions of the cycles, a condition which tends to increase the speed of the motor. With increases in supply potential which tend to increase the speed of the motor, the control feature operates to change in a direction which tends to reduce motor speed as the increased control potential thereby produced triggers the silicon controlled rectifier switching device 20 to conduction earlier in the cycle, thereby tending to reduce motor speed. The net result is that although reduced supply potential tends to reduce motor speed, the control feature changes in such a direction which tends to increase motor speed, thereby resulting in a small change of motor speed. Therefore, this novel circuit may also be employed as a motor speed regulator circuit with a fluctuating supply potential source. With this application, variable resistor 24 may, if desired, be replaced by a fixed resistor and lead 30 be connected to the junction between resistors 22 and 24.

FIGURE 4 schematically sets forth the novel circuit of this invention used with a two speed motor. A conventional single-pole, double-throw switch 40 may be operated to include or exclude the alternate winding 42 to selectively operate motor 10 at a first speed or a second speed, an expedient well known in the art. Depending upon the speed of motor 10 as selected through switch 40, variable resistor 24 or variable resistor 44 may be selectively included in the high impedance circuit by operating switch 46 which may be a conventional single-pole, three-position switch, as shown. The operation of the circuit is, of course, identical to that as described in regard to FIGURE 1 with either variable resistor 24 or 44 in the high impedance circuit.

While the control feature of this circuit has been herein shown to be connected in parallel with the phase winding 14 of the starting circuit of motor 10, speed control of this motor may also be realized if this circuit is connected in shunt with capacitor 16. In fact, with some applications and motor ratings, this connection is preferable.

Continuous automatic speed control of a motor of this type may be obtained by substituting an impedance of the type which is characterized by the ability to change its impedance value in response to external influences for variable resistor 24.

One example of an impedance element of this type is a temperature sensitive device such as a thermistor. In this case, the resistance value of the effective portion of this device would change in response to changes in temperature.

The unique circuit of the present invention, provides an infinite number of speed selections between reasonable limits at low cost without reducing the starting torque of the motor and provides speed stability with fluctuating source potentials.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A speed control circuit for an alternating current motor of the type having at least a phase winding comprising a controllable switching device having a control electrode connected in parallel with said phase winding for reducing to substantially zero the potential applied to said phase winding over that portion of each cycle during which it is conducting, a high impedance circuit connected in parallel with said phase winding, means for taking from said high impedance circuit a control potential which increases in magnitude with motor speed and means for applying said control potential to said control electrode for triggering said controllable switching device to conduction when said motor reaches a predetermined speed.

2. A speed control circuit as defined in claim 1 wherein said high impedance circuit includes at least one impedance element of the type which is characterized by the ability to change its impedance value in response to external influences.

3. A speed control circuit for varying the speed of an alternating current motor of the type having at least a phase winding comprising, a controllable switching device having a control electrode connected in parallel with said phase winding for reducing to substantially zero the potential applied to said phase winding over that portion of each cycle during which it is conducting, a control potential producing means for providing a control potential which increases in magnitude with motor speed at a rate determined by said producing means and means for applying said control potential to said control electrode whereby said controllable switching device may be triggered to conduction at various motor speeds.

4. A speed control circuit as defined by claim 3 wherein said control producing means includes at least one impedance element of the type which is characterized by the ability to change its impedance value in response to external influences.

5. An alternating current motor speed control circuit comprising in combination with a split capacitor motor having a capacitor and phase winding starting circuit, an impedance element having a movable contact connected across said capacitor for providing a control potential which may be taken from said movable contact and which increases in magnitude with motor speed at a rate determined by the adjustment of said movable contact, a controllable switching device having a control electrode connected in shunt with said capacitor for reducing to substantially zero the potential applied to said capacitor over that portion of each cycle during which it is conducting and means for applying said control potential to said control electrode for triggering said controllable switching device to conduction at various speeds.

6. A speed control circuit for varying the speed of an alternating current motor of the type having at least a phase winding comprising, a controllable switching device having a control electrode connected in parallel with said phase winding for reducing to substantially zero the potential applied to said phase winding over that portion of each cycle during which it is conducting, an impedance element having a movable contact connected across said phase winding for providing a control potential which may be taken from said movable contact and which increases in magnitude with motor speed at a rate determined by the adjustment of said movable contact and means for applying said control potential to said control electrode whereby said controllable switching device may be triggered to conduction at various motor speeds.

7. An alternating current motor speed control circuit comprising in combination with a split capacitor motor having a capacitor and phase winding starting circuit, a resistor element having a movable contact connected across said capacitor for providing a control potential which may be taken from said movable contact and which increases in magnitude with motor speed at a rate determined by the adjustment of said movable contact, a controllable switching device having a control electrode connected in shunt with said capacitor for reducing to substantially zero the potential applied to said capacitor over that portion of each cycle during which it is conducting and means for applying said control potential to said control electrode for triggering said controllable switching device to conduction at various motor speeds.

8. A speed control circuit for varying the speed of an alternating current motor of the type having at least a phase winding comprising, a controllable switching device having a control electrode connected in parallel with said phase winding for reducing to substantially zero the potential applied to said phase winding over that portion of each cycle during which it is conducting, a resistor element having a movable contact connected across said phase winding for providing a control potential which may be taken from said movable contact and which increases in magnitude with motor speed at a rate determined by the adjustment of said movable contact and means for applying said control potential to said control electrode whereby said controllable switching device may be triggered to conduction at various motor speeds.

9. An alternating current motor speed control circuit comprising in combination with a split capacitor motor having a capacitor and phase winding starting circuit a fixed impedance element, a variable impedance element having a movable contact, means for connecting said fixed and variable impedance elements in series across said capacitor for providing a control potential which may be taken from said movable contact and which increases in magnitude with motor speed at a rate determined by the adjustment of said movable contact, a controllable switching device having a control electrode connected in shunt with said capacitor for reducing to substantially zero the potential applied to said capacitor over that portion of each cycle during which it is conducting and means for applying said control potential to said control electrode for triggering said controllable switching device to conduction at various speeds.

10. A speed control circuit for varying the speed of an alternating current motor of the type having at least a phase winding comprising, a controllable switching device having a control electrode connected in parallel with said phase winding for reducing to substantially zero the potential applied to said phase winding over that portion of each cycle during which it is conducting, a fixed impedance element, a variable impedance element having a movable contact, means for connecting said fixed and variable impedance elements in series across said phase winding for providing a control potential which may be taken from said movable contact and which increases in magnitude with motor speed at a rate determined by the adjustment of said movable contact and means for applying said control potential to said control electrode whereby said controllable switching device may be triggered to conduction at various motor speeds.

11. An alternating current motor speed control circuit comprising in combination with a split capacitor motor having a capacitor and phase winding starting circuit, a fixed resistor, a variable resistor having a movable contact, means for connecting said series and fixed resistors in series across said capacitor for providing a control potential which may be taken from said movable contact and which increases in magnitude with motor speed at a rate determined by the adjustment of said movable contact, a controllable switching device having a control electrode connected in shunt with said capacitor for reducing to substantially zero the potential applied to said capacitor over that portion of each cycle during which it is conducting and means for applying said control potential to said control electrode for triggering said controllable switching device to conduction at various motor speeds.

12. A speed control circuit for varying the speed of an alternating current motor of the type having at least a phase winding comprising, a controllable switching device having a control electrode connected in parallel with said phase winding for reducing to substantially zero the potential applied to said phase winding over that portion of each cycle during which it is conducting, a fixed resistor, a variable resistor having a movable contact, means for connecting said fixed and variable resistors in series across said phase winding for providing a control potential which may be taken from said movable contact and which increases in magnitude with motor speed at a rate determined by the adjustment of said movable contact and means for applying said control potential to said control electrode whereby said controllable switching device may be triggered to conduction at various motor speeds.

13. An alternating current motor speed control circuit comprising in combination with a split capacitor motor having a capacitor and phase winding starting circuit, a fixed resistor, a variable resistor having a movable contact, means for connecting said fixed and variable resistors in series across said capacitor for providing a control potential which may be taken from said movable contact and which increases in magnitude with motor speed at a rate determined by the adjustment of said movable contact, a silicon controlled rectifier switching device having a control electrode connected in shunt with said capacitor for reducing to substantially zero the potential applied to said capacitor over that portion of each cycle during which it is conducting and means for applying said control potential to said control electrode for triggering said silicon controlled rectifier to conduction at various motor speeds.

14. A speed control circuit for varying the speed of an alternating current motor for the type having at least a phase winding comprising, a silicon controlled rectifier switching device having a control electrode connected in parallel with said phase winding for reducing to substantially zero the potential applied to said phase winding over that portion of each cycle during which it is conducting, a fixed resistor, a variable resistor having a movable contact, means for connecting said fixed and variable resistors in series across said phase winding for providing a control potential which may be taken from said movable contact and which increases in magnitude with motor speed at a rate determined by the adjustment of said movable contact and means for connecting said movable contact to said control electrode for applying said control potential thereto whereby said silicon controlled rectifier switching device may be triggered to conduction at various motor speeds.

15. A circuit for regulating the speed of an alternating current motor of the type having at least a phase winding energized by a fluctuating supply potential source comprising, a controllable switching device having a control electrode connected in parallel with said phase winding for reducing to substantially zero the potential applied to said phase winding over that portion of each during which it is conducting, a control potential producing means for providing a control potential which increases and decreases in magnitude with supply potential fluctuations at a rate determined by said producing means and means for applying said control potential to said control electrode whereby said controllable switching device may be triggered to conduction in response to changes in supply potential magnitude.

References Cited

UNITED STATES PATENTS

| | | | |
|---|---|---|---|
| 2,095,281 | 10/1937 | Owens | 318—221 |
| 2,576,084 | 11/1951 | Trevitt | 318—230 X |
| 2,774,021 | 12/1956 | Ehret | 318—227 X |
| 2,919,391 | 12/1959 | Charbonneaux | 318—220 X |
| 2,991,402 | 7/1961 | Imada et al. | 318—221 |
| 3,071,718 | 1/1963 | Gordon | 318—221 X |
| 3,116,445 | 12/1963 | Wright | 318—220 |
| 3,258,668 | 6/1966 | Milligan | 318—221 |

ORIS L. RADER, *Primary Examiner.*

G. Z. RUBINSON, *Assistant Examiner.*